(12) United States Patent
Cha et al.

(10) Patent No.: US 8,678,461 B2
(45) Date of Patent: Mar. 25, 2014

(54) STORAGE APPARATUS FOR VEHICLE

(75) Inventors: Dong Eun Cha, Seongnam-si (KR);
Seung Mok Lee, Hwaseong-si (KR);
Hun Soo Kim, Hwaseong-si (KR); Hoo Taek Cho, Yongin-si (KR); Jeong Ho Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/323,460

(22) Filed: Dec. 12, 2011

(65) Prior Publication Data
US 2013/0088034 A1    Apr. 11, 2013

(30) Foreign Application Priority Data

Oct. 5, 2011    (KR) .................. 10-2011-0101150

(51) Int. Cl.
*B60R 9/06*    (2006.01)
*B60R 11/00*    (2006.01)

(52) U.S. Cl.
USPC ............ 296/37.1; 296/37.14; 296/26.03; 296/26.05; 224/489

(58) Field of Classification Search
USPC ........ 296/37.1, 37.14, 26.03, 26.05; 224/488, 224/489, 491, 492
See application file for complete search history.

(56) References Cited

U.S. PATENT DOCUMENTS

| | | |
|---|---|---|
| 2,490,014 A | 12/1949 | Brand |
| 2,545,269 A | 3/1951 | Ford |
| 2,953,287 A | 9/1960 | Werner |
| 4,089,554 A * | 5/1978 | Myers .......................... 296/37.1 |
| 4,312,620 A | 1/1982 | Muschalek, Jr. |
| 4,570,986 A | 2/1986 | Sams |
| 4,676,415 A | 6/1987 | Kennedy |
| 5,135,274 A | 8/1992 | Dodd |
| 5,823,585 A | 10/1998 | Tanguay |
| 6,474,715 B2 | 11/2002 | Fukushima et al. |
| 6,575,509 B1 | 6/2003 | Golden |
| 6,644,707 B2 | 11/2003 | McLaughlin et al. |
| 7,121,597 B2 | 10/2006 | Chuang |
| 7,281,745 B1 | 10/2007 | Meinke et al. |
| 7,347,474 B2 | 8/2008 | Shagbazyan |
| 8,256,807 B2 | 9/2012 | Lucas |
| 8,302,829 B2 | 11/2012 | Lee et al. |
| 2002/0105201 A1 | 8/2002 | Melotik et al. |
| 2007/0102465 A1 | 5/2007 | Wezyk et al. |
| 2008/0006667 A1 | 1/2008 | Bergerhoff et al. |

FOREIGN PATENT DOCUMENTS

| | | |
|---|---|---|
| DE | 195 38 734 A1 | 5/1996 |
| DE | 101 24 375 C1 | 11/2002 |
| JP | 2001-334879 A | 12/2001 |
| JP | 2007-245959 A | 9/2007 |
| JP | 4332827 B2 | 7/2009 |

* cited by examiner

*Primary Examiner* — Glenn Dayoan
*Assistant Examiner* — Melissa A Black
(74) *Attorney, Agent, or Firm* — Morgan, Lewis & Bockius LLP

(57) ABSTRACT

A storage apparatus for a vehicle may include a rear back beam installed to be drawn out from a rear bumper while sliding to a rear side of the vehicle, and a pair of left and right storage boxes installed to be seated on the rear back beam and extending while sliding in a traverse direction of the vehicle when the rear back beam may be drawn out to the rear side of the vehicle.

9 Claims, 7 Drawing Sheets

STORAGE APPARATUS FOR VEHICLE

CROSS-REFERENCE TO RELATED APPLICATION

The present application claims priority to Korean Patent Application No. 10-2011-0101150, filed on Oct. 5, 2011, the entire contents of which is incorporated herein for all purposes by this reference.

BACKGROUND OF THE INVENTION

1. Field of the Invention

The present invention relates to a storage apparatus for a vehicle, and more particularly, to a storage apparatus for a vehicle that can store a luggage by using an inner space of a rear bumper or can be used as a step and a bench.

2. Description of Related Art

FIG. 1 shows a vehicle with a storage box 2 provided in a space of a trunk room 1. A known structure of FIG. 1 as a structure of drawing out the storage box 2 by opening a trunk rid 3 has inconvenience depending on opening and closing operations of the trunk rid 3 and has a disadvantage in which the space of the trunk room 1 may be contaminated by moisture and in particular, has a disadvantage in which the inner space of the rear bumper corresponding to a spare space cannot be used as a storage structure.

In addition, in a known storing structure shown in FIG. 2 as a structure in which a rear bumper 11 is used as a door of a storing space 12, the rear bumper 11 is opened and thereafter, an article 13 can be stored in the storing space 12 provided below the vehicle.

However, in the known structure of FIG. 2 as a structure in which the rear bumper 11 is used as the door of the storing space 12, the inner space of the rear bumper 11 corresponding to the spare space cannot be used as the storing structure like the known structure of FIG. 1.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a storage apparatus for a vehicle that can use an inner space of a rear bumper corresponding to a spare space of the vehicle as a storing structure to actively use the spare space of the vehicle and in particularly, can easily store an article having a large length by extending a drawn out storage box and furthermore, can use an opened storage box as a step and a bench.

In an aspect of the present invention, a storage apparatus for a vehicle, may include a rear back beam installed to be drawn out from a rear bumper while sliding to a rear side of the vehicle, and a pair of left and right storage boxes installed to be seated on the rear back beam and extending while sliding in a traverse direction of the vehicle when the rear back beam is drawn out to the rear side of the vehicle.

The storage apparatus for the vehicle may further include a back beam shifting device installed to be connected with the rear back beam and installed to be fixed to a rear floor panel and a rear side member to slide the rear back beam in a longitudinal direction of the vehicle.

The storage apparatus may further include a storage box shifting device installed to be connected with the back beam shifting device and the pair of storage boxes to slide the pair of storage boxes in the traverse direction of the vehicle.

The back beam shifting device may include a pair of guide rails installed to cover a pair of fixation frames and be fixed to the bottom of the rear floor panel at lateral sides of the vehicle and installed with both ends placed in the longitudinal direction of the vehicle, a shift bar installed with both ends thereof connected to the pair of guide rails to slide in the longitudinal direction on the pair of guide rails, a pair of first link members of which each one end is hinge-coupled to the shift bar and each of the other ends is hinge-coupled to the pair of left and right storage boxes, the pair of fixation frames integrally coupled to a rear end of the rear side member in the longitudinal direction of the rear side member, and the pair of frame cases installed to be connected to both distal ends of the rear back beam to slidably move in the longitudinal direction on the fixation frames.

The storage box shifting device may include a rear stopper integrally protruded on a rear side surface of the fixation frame to restrain rear movement of the frame cases, and a back beam plate fixed to be seated on the rear back beam and having plate grooves into which side surfaces of the pair of storage boxes selectively fit, respectively, wherein the plate grooves guide the pair of storage boxes to move backward while the shift bar moves backward and wherein the storage boxes are released from the back beam plate and move in the traverse direction of the vehicle by the first link members when the rear back beam is drawn out to the rear side of the vehicle.

A front stopper restraining front movement of the frame case integrally protrudes on a front end surface of the fixation frame.

The pair of first link members may have a characterized structure in which an interval between the first link members is larger at the other ends hinge-coupled with the storage boxes than the one ends hinge-coupled with the shift bar.

Each of the pair of left and right storage boxes may include a lower channel fixed onto the rear back beam in the traverse direction of the vehicle, a lower plate installed on the lower channel to move in the longitudinal direction of the lower channel, hinge-coupled with the other ends of the first link members penetrating the rear back beam and the lower channel, and having a plate protrusion fit in a plate groove integrally formed on one side surface of the lower plate, a lower tray fixed onto the lower plate and having a space for keeping an article provided therein, an upper tray rotatably coupled with respect to the lower tray to open/close the lower tray, and a tray cover integrally coupled to the upper tray.

The storage apparatus for the vehicle may further include a plurality of second link members of which both ends are hinge-coupled to both sides of the lower tray and the upper tray, respectively.

The plate groove may include a primary groove that is formed toward a rear side from a front side of the back beam plate and receives the plate protrusion of the lower plate to enable the lower plate to move in the longitudinal direction and prevent the lower plate from being removed therefrom, and a secondary groove having a larger width than the plate protrusion and disposed at a rear end of the primary groove to enable the lower plate to be removed therefrom.

The tray cover that rotates to the rear side of the vehicle is usable as a step or a bench.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
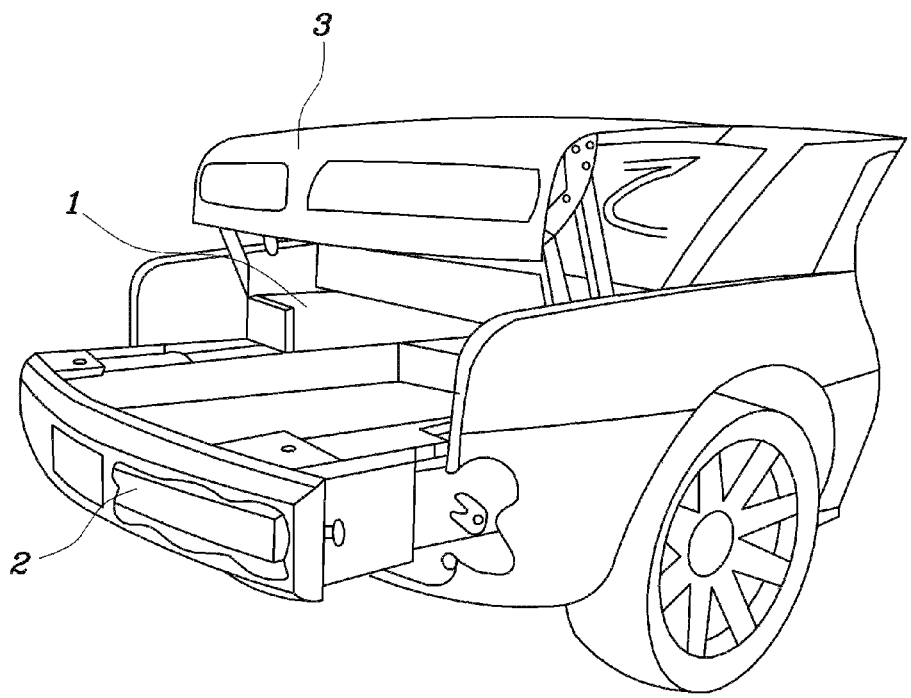
FIGS. 1 and 2 are diagrams for describing a vehicle storage apparatus in the related art.
Figure 2:
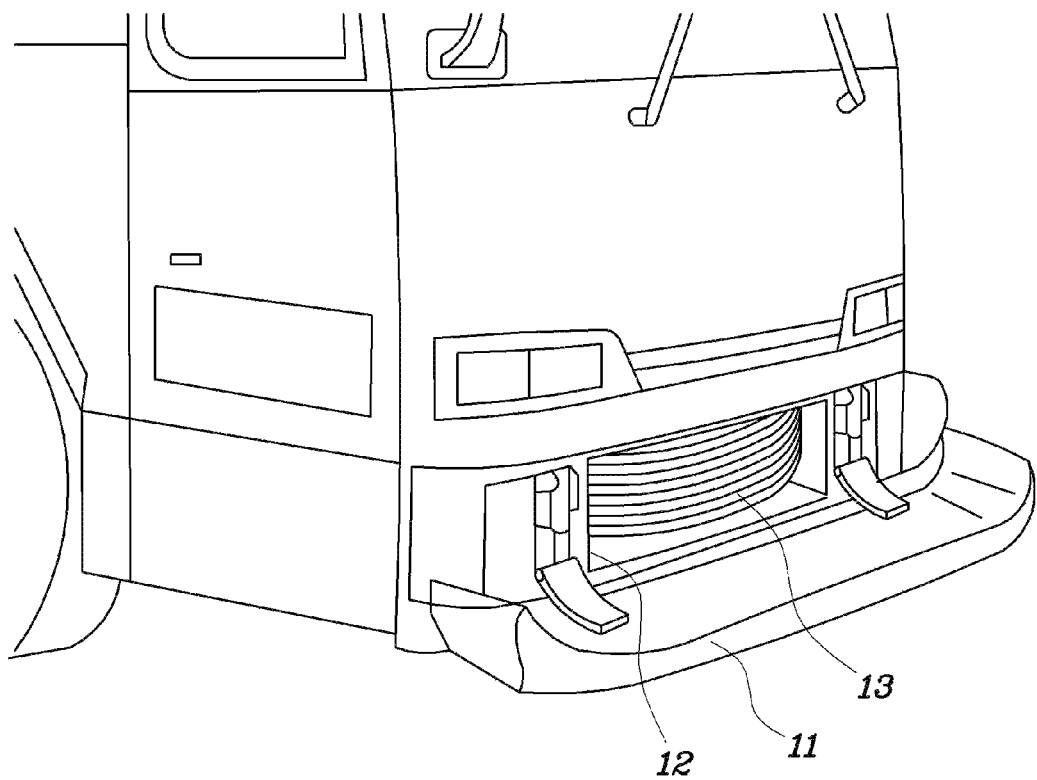

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, a storage apparatus for a vehicle according to an exemplary embodiment of the present invention will be described with reference to the accompanying drawings.

The storage apparatus for the vehicle according to the exemplary embodiment of the present invention as a structure using an inner space 22 of a vehicle rear bumper 21 corresponding to a spare space as shown in FIGS. 3 to 14 includes a rear back beam 30 installed to be drawn out from the rear bumper 21 while sliding to the rear side of the vehicle and a pair of left and right storage boxes 40 installed to be seated on the rear back beam 30 and extending while sliding in left and right directions of the vehicle when the rear back beam 30 is drawn out to the rear side of the vehicle.

Further, the storage apparatus according to the exemplary embodiment of the present invention further includes a back beam shifting device 50 installed to be connected with the rear back beam 30 and installed to be fixed to a rear floor panel 23 and a rear side member 24 to slide the rear back beam 30 in forward and backward directions and a storage box shifting device 60 installed to be connected with the back beam shifting device 50 and the pair of storage boxes 40 to slide the pair of storage boxes 40 in the left and right directions.

Herein, the back beam shifting device 50 includes a pair of guide rails 51 installed to be fixed to the bottom of the rear floor panel 23 at the left and right sides of the vehicle and installed with both ends placed in the forward and backward directions of the vehicle, a shift bar 52 installed with both ends connected to the pair of guide rails 51 to slide in the forward and backward directions on the pair of guide rails 51, a pair of link members 53 of which each one end is hinge-coupled to the shift bar 52 and each of the other ends is hinge-coupled to the pair of left and right storage boxes 40, a pair of fixation frames 54 integrally coupled to a rear end of the rear side member 24 in the longitudinal direction of the rear side member 24, and a pair of frame cases 55 installed to cover the fixation frames and be connected to both left and right ends of the rear back beam 30 to move in the forward and backward directions on the fixation frame 54.

In addition, the storage box shifting device 60 includes a rear stopper 61 integrally protruded on the side surface of the fixation frame 54 to restrain rear movement of the frame case 55 and a back beam plate 63 fixed to be seated on the rear back beam 30 and having plate grooves 62 in which the side surfaces of the pair of storage boxes 40 fit, respectively, which are formed on both side surfaces thereof to move the storage box 40 in the left and right directions while guiding the pair of storage boxes 40 to move backward when the shift bar 52 moves backward.

Meanwhile, a front stopper 56 restraining front movement of the frame case 55 integrally protrudes on a front end of the fixation frame 54.

That is, when the frame case 55 coupled with the rear back beam 30 moves with respect to the fixation frame 54 to the rear side of the vehicle, the rear stopper 61 restrains the rear movement of the frame case 55 and when the frame case 55 moves to the front side of the vehicle, the front stopper 56 restrains the front movement of the frame case 55.

In addition, the pair of link members 53 has a characterized structure in which the interval between the link members 53 is larger at the other end hinge-coupled with the storage box 40 than ends hinge-coupled with the shift bar 52.

That is, the ends of the pair of link members 53 is hinge-coupled at a middle point of the shift bar 52 and the other ends of the pair of link members 53 are hinge-coupled with the storage box 40 while maintaining the wider interval than the ends.

Due to the coupling structure of the link members 53, the pair of left and right storage boxes 40 extends while sliding in the left and right directions of the vehicle body when the shift bar 52 moves to the rear side.

In addition, each of the pair of left and right storage boxes 40 includes a lower channel 41 fixed onto the rear back beam 30 in the left and right directions of the vehicle body, a lower plate 42 installed on the lower channel 41 to move in the longitudinal direction of the lower channel 41, hinge-coupled with the other end of the link member 53 penetrating the rear back beam 30 and the lower channel 41, and having a plate protrusion 42a fit in the plate groove 62 integrally formed on one side surface thereof, a lower tray 43 fixed onto the lower plate 42 and having a space for keeping an article provided therein, an upper tray 44 rotatably coupled with respect to the lower tray 43 to open/close the lower tray 43, and a tray cover 45 integrally coupled to the upper tray 44.

The lower plate 42 is adopted to reinforce the stiffness of the lower tray 43 and in particular, when the lower plate 42 and the lower tray 43 are coupled to be separated from each other, the lower tray 43 can be easily repaired and cleaned.

In the exemplary embodiment of the present invention, a plurality of link members 46 are adopted to rotate the upper tray 44, and as a result, both ends of each of the link members 46 are hinge-coupled to both sides of the lower tray 43 and the upper tray 44, respectively.

The plate protrusion 42a protrudes in a T-shaped cross section to the side of the lower plate 42 and the plate groove 62 is a T-shaped cross-sectional groove corresponding to the plate protrusion 42a.

The plate groove 62 includes a primary groove 62a that is formed toward the rear side from the front side of the back beam plate 63 to enables the plate protrusion 42a to move in the forward and backward direction and prevent the plate protrusion 42a from being removed toward the side and a secondary groove 62b having a larger vertical width than the primary groove 62a to enable the plate protrusion 42a to be removed toward the side.

Figure 14:
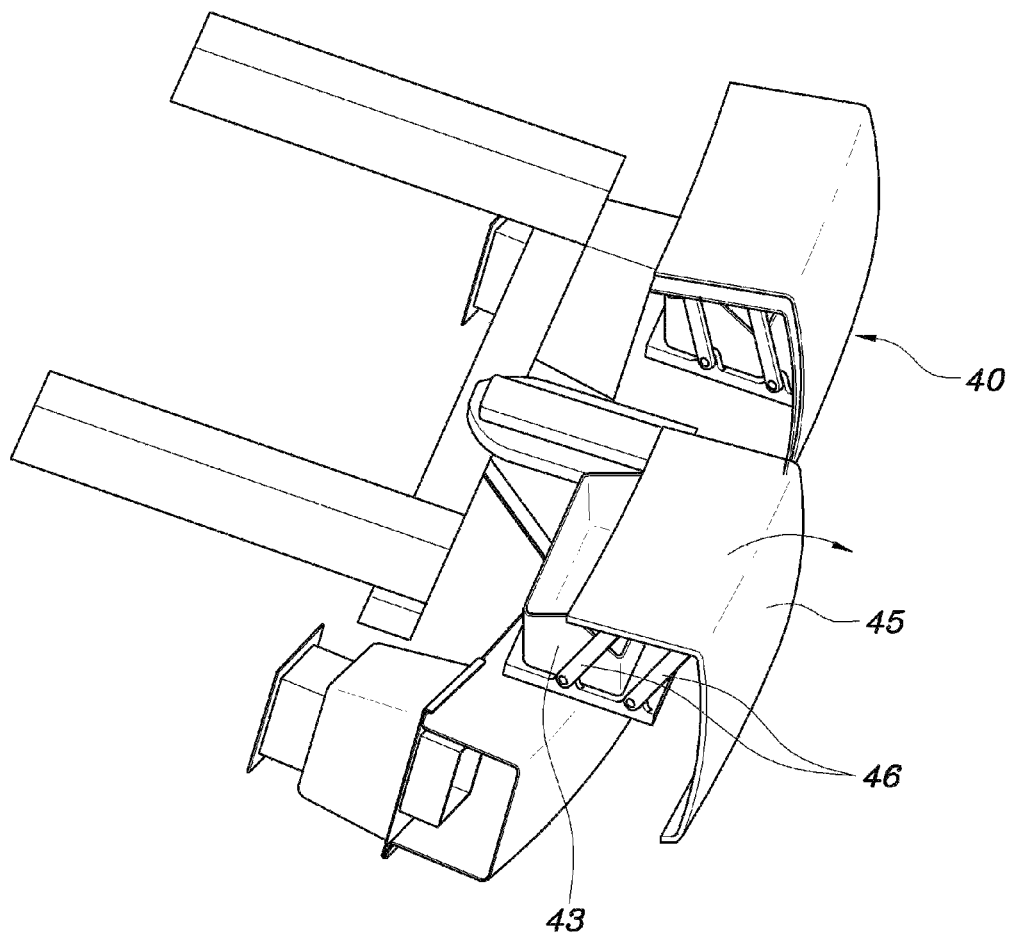
FIG. 14 is an operational diagram when a tray cover of the storage box rotates to the rear side in the storage apparatus according to the exemplary embodiment of the present invention.

Meanwhile, in the exemplary embodiment of the present invention, when the upper tray 44 and the tray cover 45 rotate to the rear side to open the lower tray 43 as shown in FIG. 14, the tray cover 45 may be used as the step or bench.

Undescribed reference numeral 25 represents a trunk rid or a tailgate and undescribed reference numeral 26 represents a rear end panel.

Hereinafter, an operation of the storage apparatus according to the exemplary of the present invention will be described.

Figure 3:
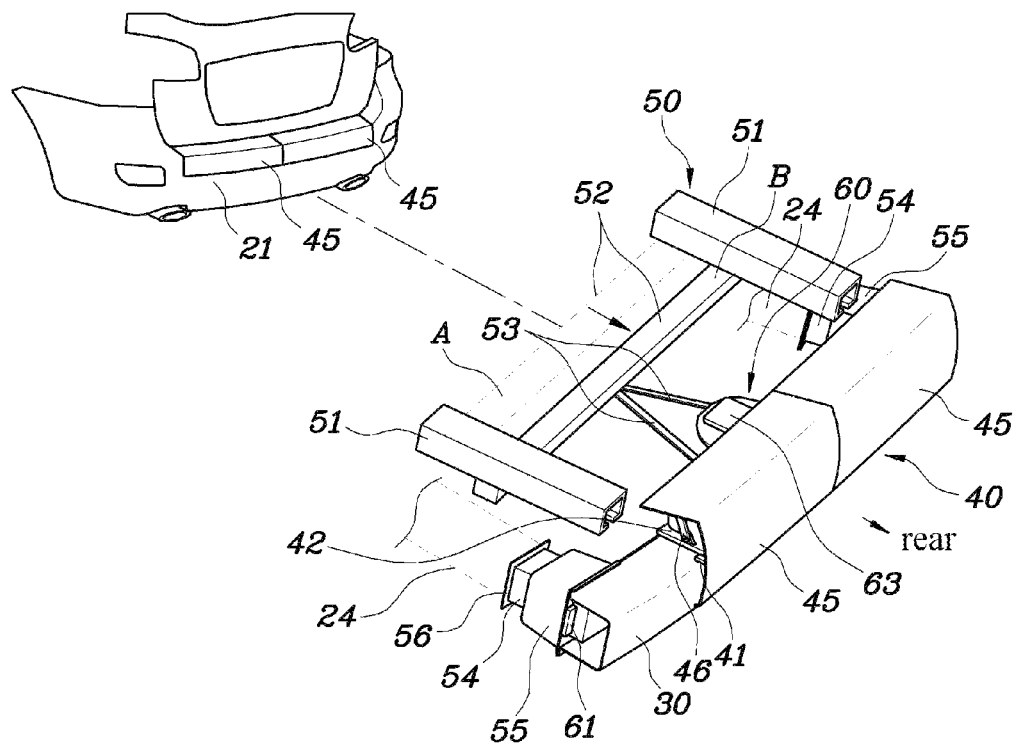
FIG. 3 is a perspective view of a storage apparatus according to an exemplary embodiment of the present invention.
Figure 6:
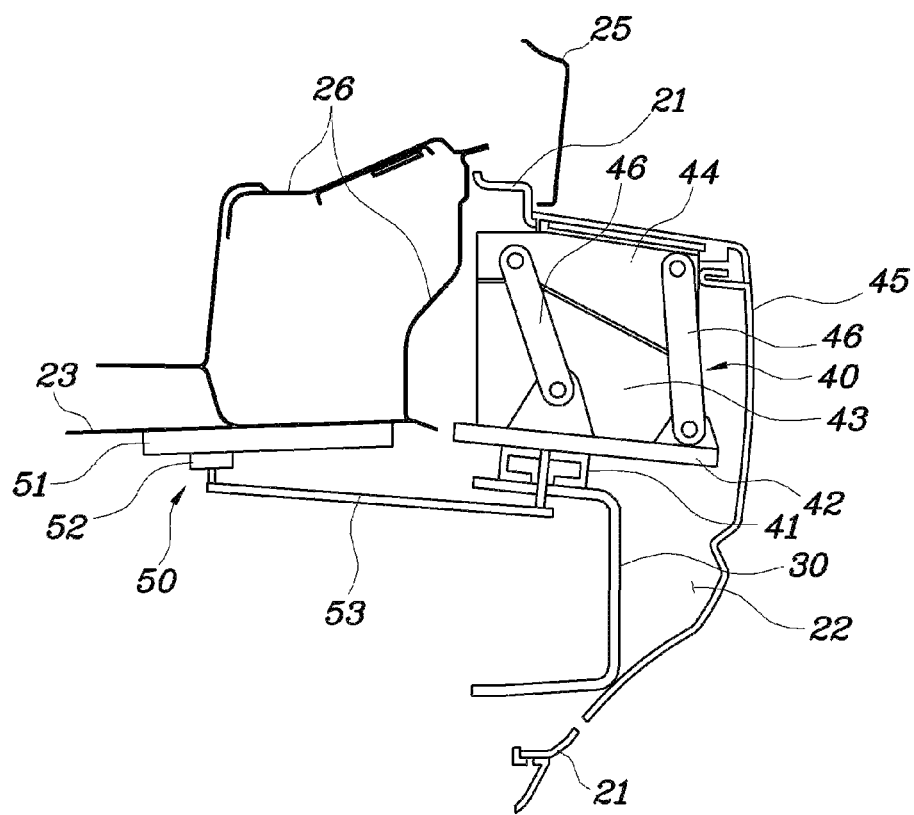
FIG. 6 is a cross-sectional view of FIG. 3.

In a left diagram of FIG. 3 and a diagram of FIG. 6, the storage box 40 is stored in the inner space 22 of the rear bumper 21 corresponding to the spare space of the vehicle and the upper tray 44 seals the lower tray 43. In this case, desired articles can be stored and kept in an inner space of the lower tray 43.

In the above state, rotational operations of the upper tray 44 and the tray cover 45 are restrained by an additional locking device.

Further, as shown in FIG. 6, when the storage box 40 is stored in the inner space 22 of the rear bumper 21, the shift bar 52 maintains state A expressed by dotted lines in FIG. 3 and the frame case 55 maximally moves to the front side, and as a result, the frame case 55 is in contact with the front stopper 56.

In addition, when external force acts on the rear bumper 21 due to a rear collision accident under the state shown in FIG. 6, the rear bumper 21 may absorb impacts while the storage box 40 according to the exemplary embodiment of the present invention is collapsed by the external force, and as a result, the storage box 40 according to the exemplary embodiment of the present invention may have even an impact absorbing function for protecting passengers.

Figure 4:
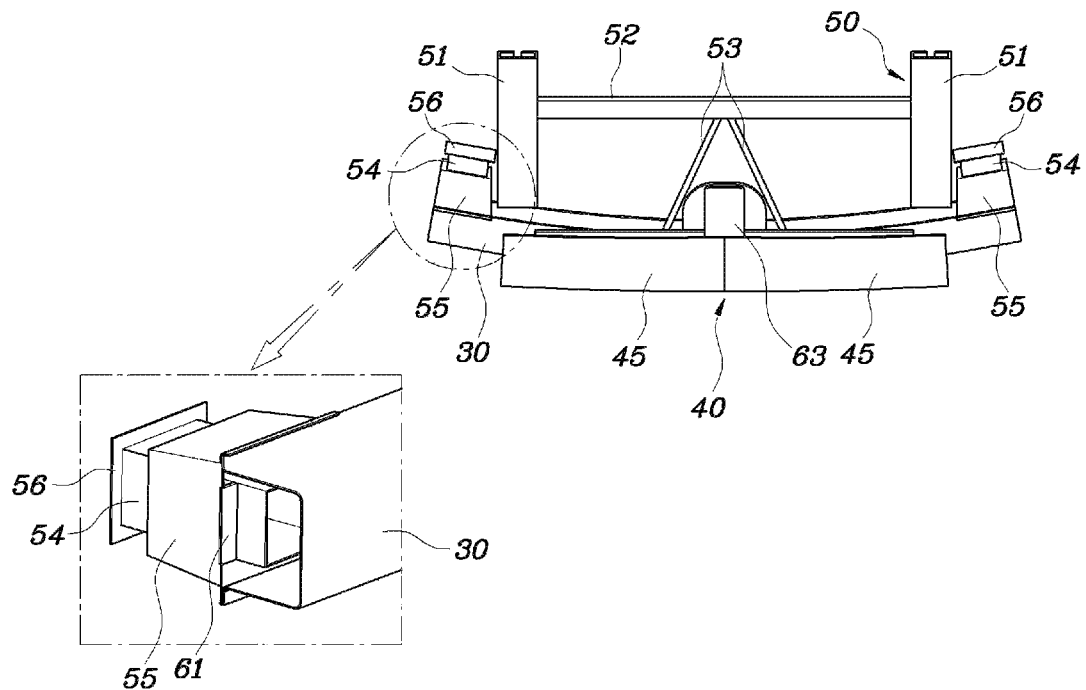
FIGS. 4 and 5 are a plan view and a bottom view of FIG. 3.
Figure 5:
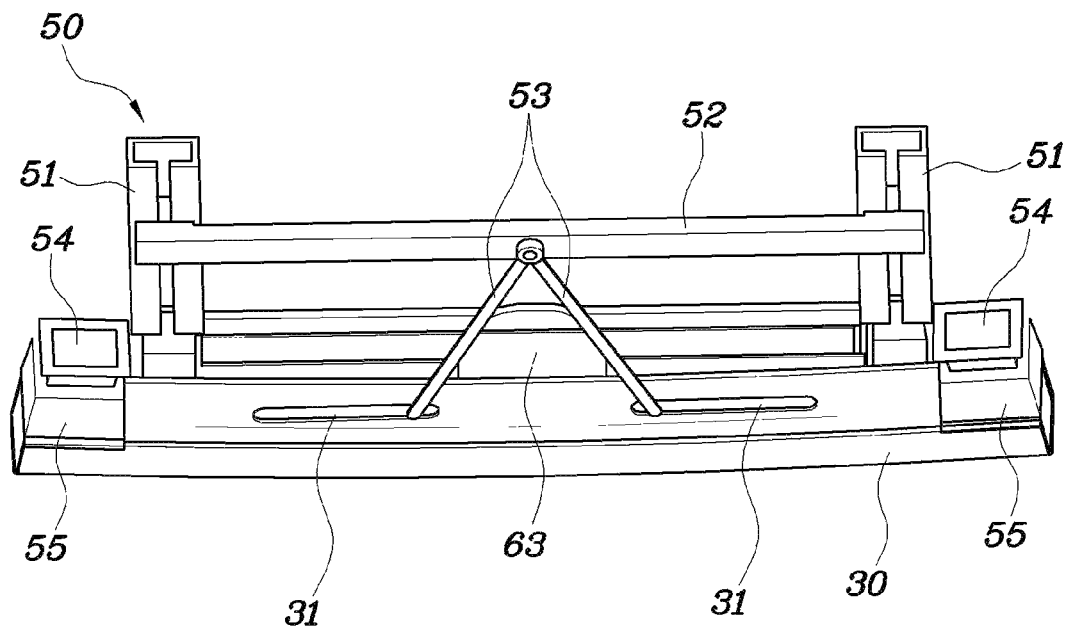

Further, in a right diagram of FIG. 3, and FIGS. 4 and 5, the rear back beam 30 and the storage box 40 are drawn out while sliding the rear side of the vehicle from the rear bumper 21 and the shift bar 52 moves to the rear side on the guide rail 51 to maintain a state of B in FIG. 3 and the frame case 55 moves to the rear side to maintain the contact with the rear stopper 61.

That is, when the locking device is cancelled and thereafter, the storage box 40 stored in the inner space 22 of the rear bumper 21 is pulled to the rear side of the vehicle, the shift bar 52 which is positioned at location A of FIG. 3 moves to the rear side on the guide rail 51 to be positioned at location B of FIG. 3 and at the same time, the frame case 55 contacting the front stopper 56 moves to the rear side to contact the rear stopper 61.

When the shift bar 52 moves to the rear side, the link member 53 transfers force at that time to the storage box 40 to move the storage box 40 to the rear side together and when the storage box 40 moves to the rear side, the link member 53 penetrates the rear back beam 30 and the lower channel 42, and as a result, the rear back beam 30 moves to the rear side by the rear movement of the link member 53 and the frame case 55 coupled with the rear back beam 30 moves to the rear side by the rear movement of the rear back beam 30 to contact the rear stopper 61.

As described above, the shift bar 52 moves to the rear side from location A to location B of FIG. 3 and at the same time, when the frame case 55 moves to the rear side to contact the rear stopper 61, both the rear back beam 30 and the storage box 40 stored in the inner space 22 of the rear bumper 21 move to the rear side to be draw out from the rear bumper 21.

Figure 10:
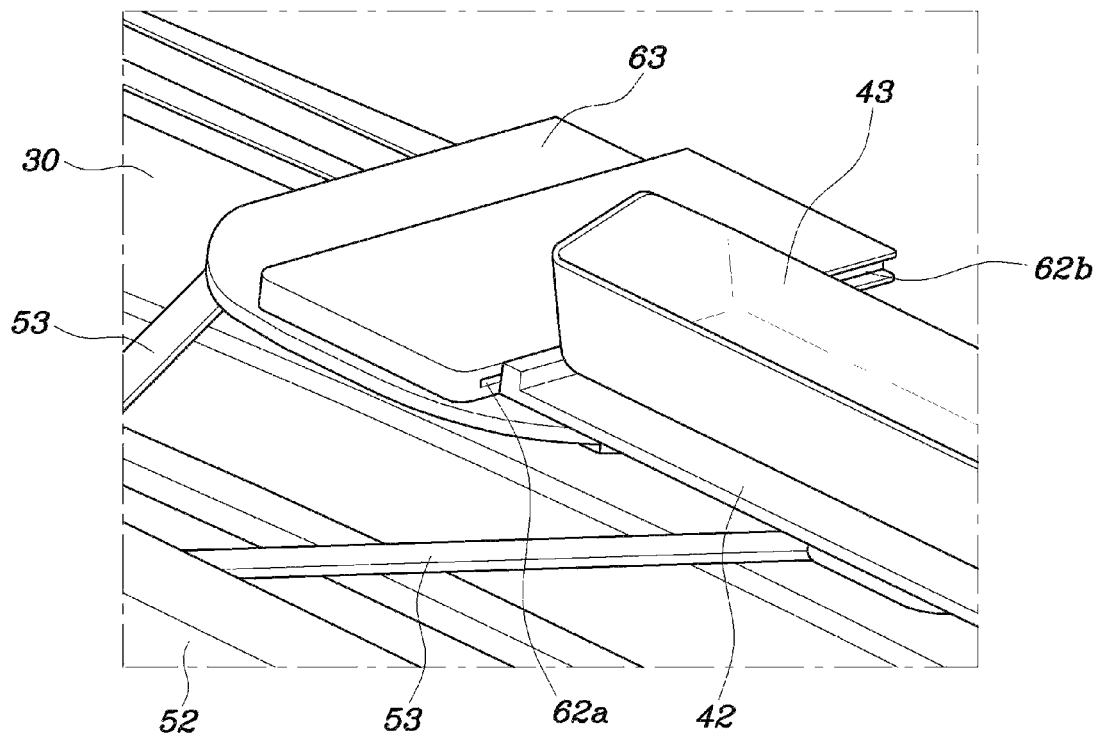

Meanwhile, when the rear back beam 30 and the storage box 40 are stored in the inner space 22 of the rear bumper 21 as shown in FIG. 6, the plate protrusion 42a formed on the lower plate 42 fits in the primary groove 62a of the plate groove 62 formed on the back beam plate 63 as shown in FIG. 10 and in this case, as the plate protrusion 42a cannot be removed from the primary groove 62a, the lower plate 42 cannot move to the side of the back beam plate 63, and as a result, the pair of left and right storage boxes 40 cannot move to the right and left sides of the vehicle not to be extended.

Figure 11:
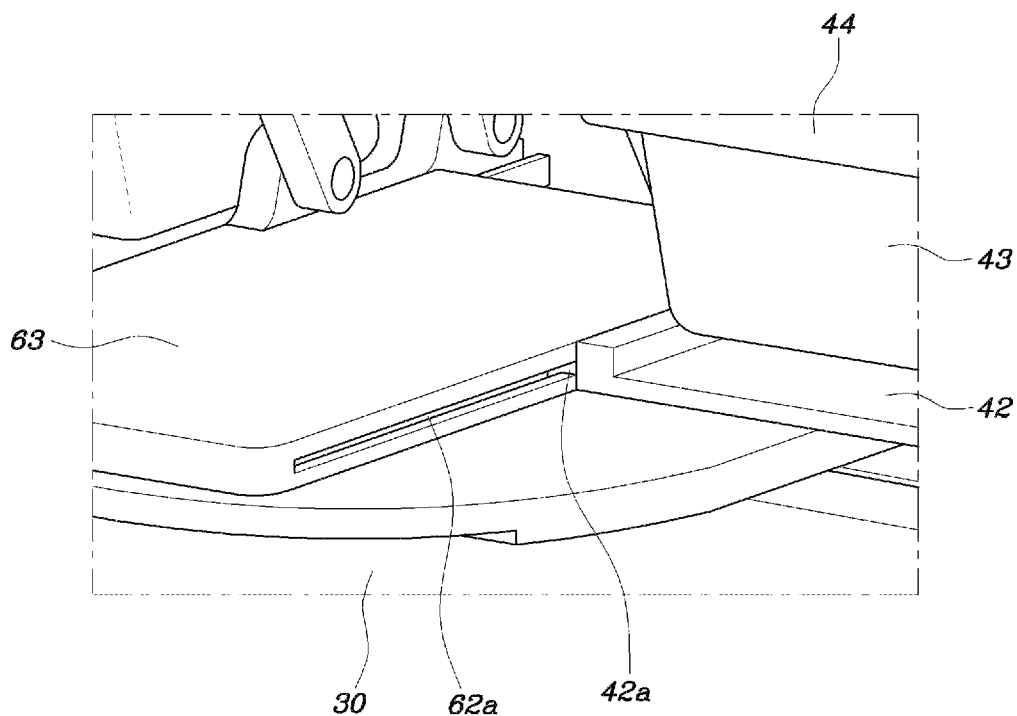

In addition, when both the rear back beam 30 and the storage box 40 stored in the inner space 22 of the rear bumper 21 moves to the rear side to be drawn out from the rear bumper 21, the plate protrusion 42a formed on the lower plate 42 moves to the rear side on the primary groove 62a to fit in the secondary groove 62b of the plate groove 62 as shown in FIG. 11 and in this case, as the plate protrusion 42a is smoothly removed from the secondary groove 62b, the lower plate 42 in a stand-by state to slide the side of the back beam plate 63, and a result, the pair of left and right storage boxes 40 are also in a stand-by state to move in the left and right sides of the vehicle.

As shown in the right diagram of FIG. 3, when the shift bar 52 further moves to the rear side of continuously while the rear back beam 30 and the storage box 40 are drawn out to the rear side, the link member 53 transfers the shift force of the shift bar 52 to the storage box 40 to move the storage box 40 and the rear back beam 30 to the rear side, but in this case, since the frame case 55 is suspended on the rear stopper 61, the storage box 40 and the rear back beam 30 cannot move the rear side any longer.

Figure 12:
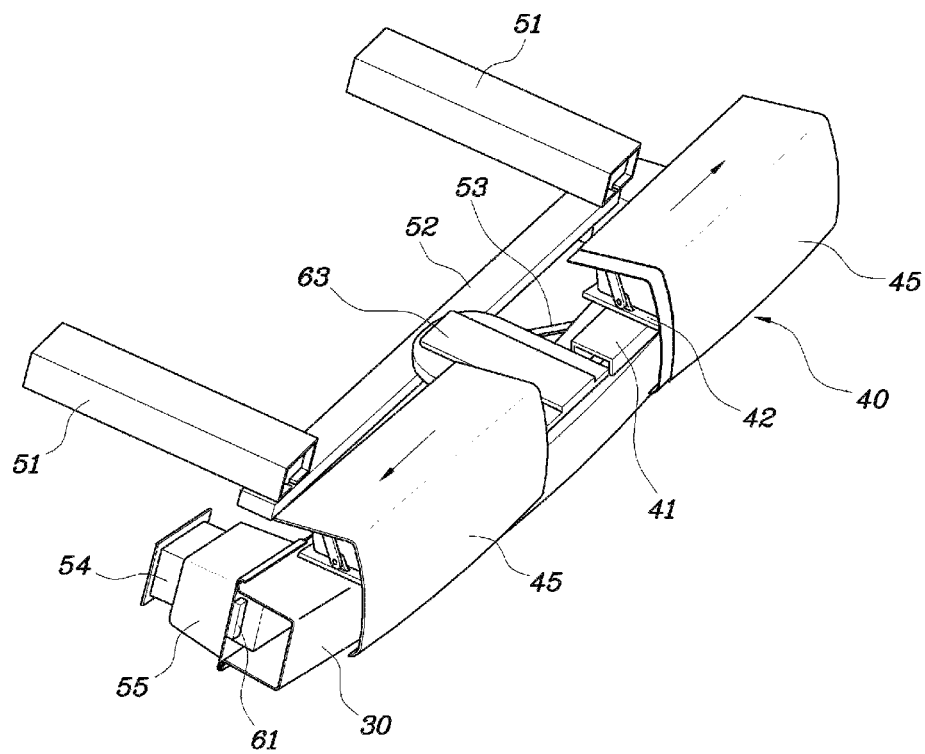
FIGS. 12 and 13 are a perspective view and a plan view of the case where a storage box is extended horizontally while the storage apparatus is according to the exemplary embodiment of the present invention is drawn out to the rear side.
Figure 13:
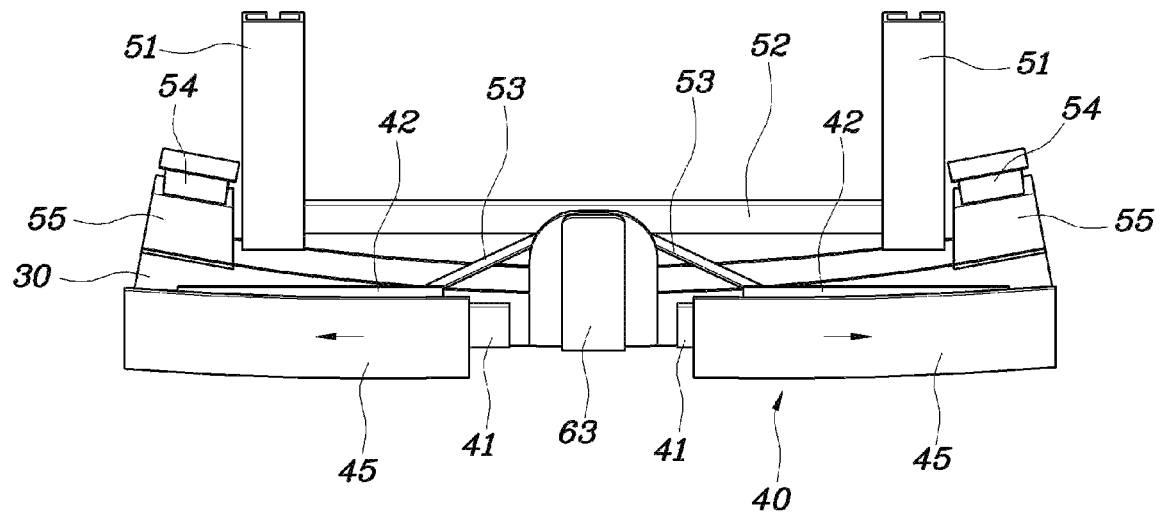

However, the pair of link members 53 are further extended in the left and right directions, respectively by the rear shifting force of the shift bar 52, and as a result, the pair of left and right storage boxes 40 coupled with the link member 53 are extended while sliding in the left and right directions of the vehicle, respectively as shown in FIGS. 12 and 13.

Figure 7:
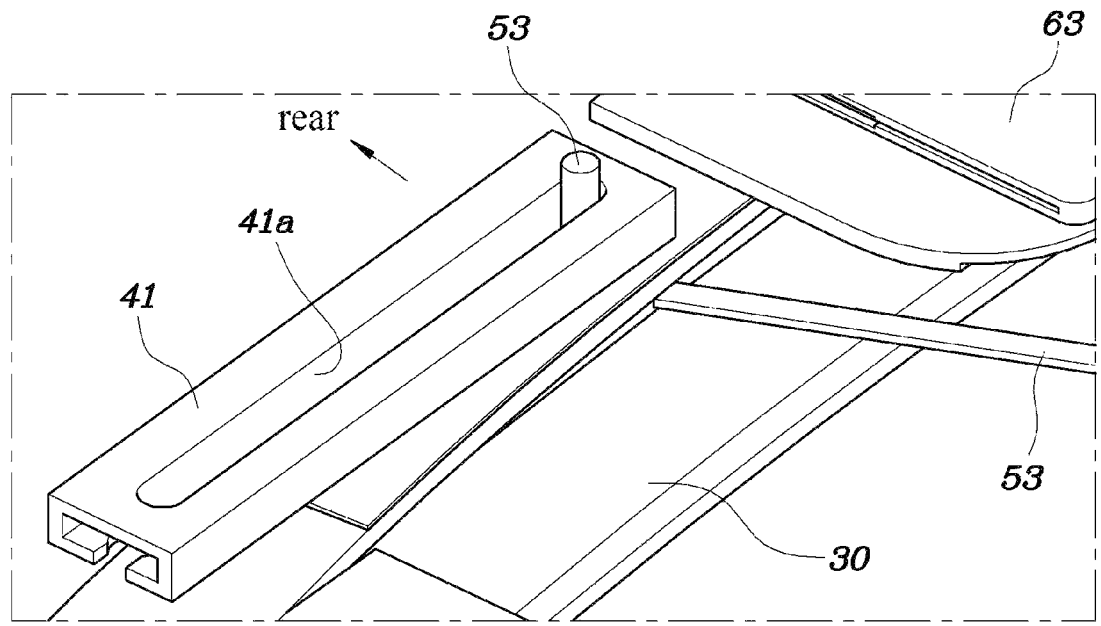
FIGS. 7 to 11 are diagrams for describing constituent components of the storage apparatus according to the exemplary embodiment of the present invention.
Figure 8:
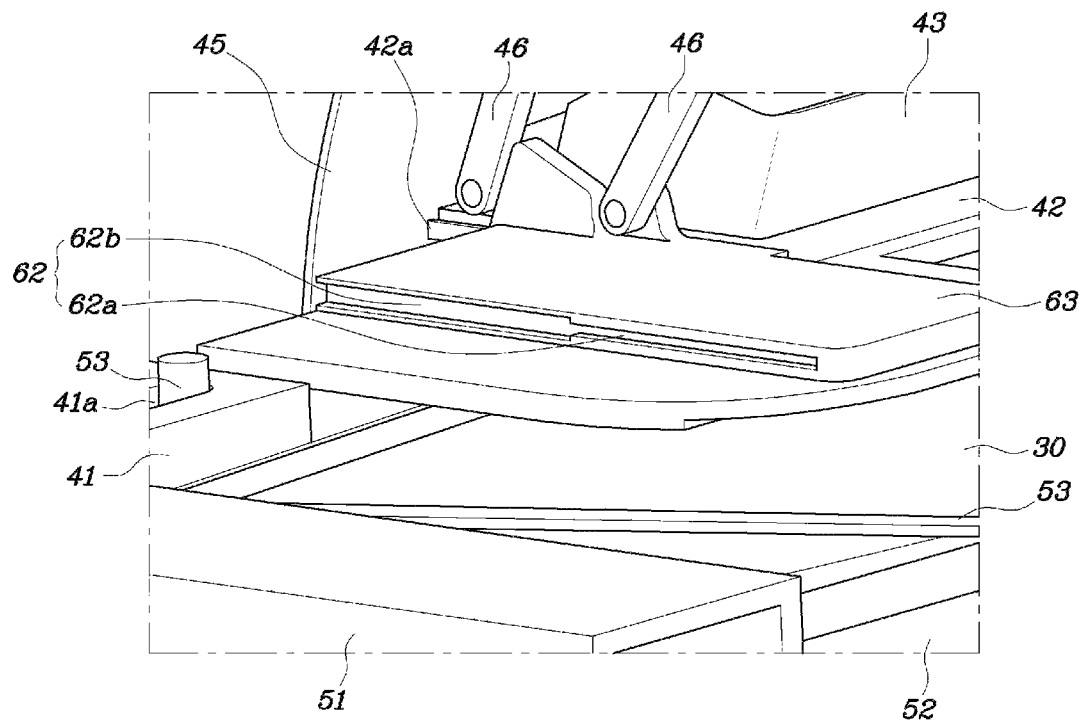
Figure 9:
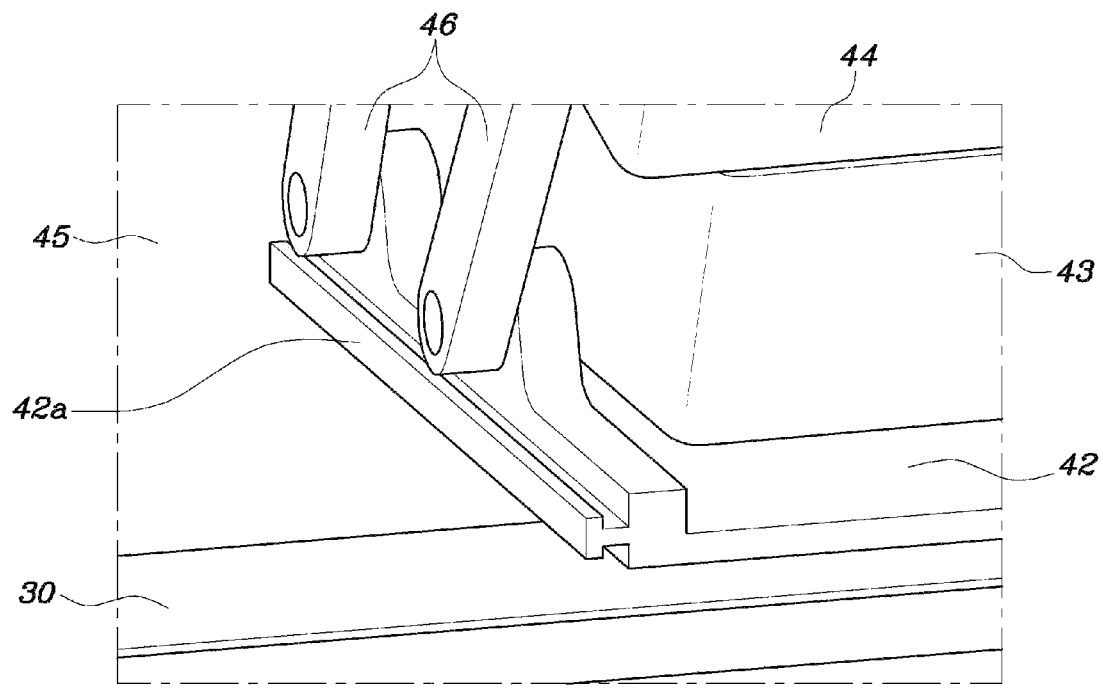

That is, a pair of slots 31 cut in the left and right directions are formed at the left and right sides of the rear back beam 30 as shown in FIG. 5 and a slot 41a connected with the slot 31 is formed in even a pair of lower channels 41 with the same shape as shown in FIG. 7. The link member 53 is hinge-coupled with the lower plate 42 constituting the storage box 40 penetrating the slots 31 and 41a. Therefore, when the pair of link members 53 are extended to grow apart from each other by the continuous rear movement of the shift bar 52 while the frame case 55 is suspended on the rear stopper 61, the ends of the link members 53 move to the side of the vehicle on the slots 31 and 41a, and as a result, the pair of left and right storage boxes 40 coupled with the link members 53 also slide in the left and right directions of the vehicle, respectively, such that the pair of left and right storage boxes 40 are also extended in the left and right directions of the vehicle as shown in FIGS. 12 and 13.

Meanwhile, when only the storage box 40 slides in the left and right directions while the rear back beam 30 and the storage box 40 are drawn out to the rear side, the plate protrusion 42a formed on the lower plate 42 falls out while being removed from the secondary groove 62b.

In addition, when the lower tray 43 is opened by rotating the tray cover 45 and the upper tray 44 to the rear side as shown in FIG. 14 in the storage box 40 that is extended in the left and right directions, the articles stored in the lower tray 43 may be taken out and used or a new article may be stored in the lower tray 43.

In addition, by opening the side surface of the pair of storage boxes 40 extended in the left and right directions, which face each other, an article having a large length, such as an umbrella or a golf club may be easily stored by using the pair of extended storage boxes 40.

Further, in the exemplary embodiment, when the lower tray 43 is opened by rotating the tray cover 45 to the rear side as shown in FIG. 14, the tray cover 45 may be used as the step or bench or the article may be seated on the tray cover 45.

As described above, in the exemplary embodiment of the present invention, the storage apparatus is installed by using the inner space 22 of the rear bumper 21 corresponding to the spare space of the vehicle to maximize the spatial utilization of the vehicle, thereby improving the merchantability of the vehicle.

Further, in the storage apparatus according to the exemplary embodiment of the present invention, the pair of left and right storage boxes 40 that are drawn out to the rear side of the vehicle are extended in the left and right directions of the vehicle and thereafter, the long article can also be easily stored by using the pair of extended storage boxes 40, and as a result, the utilization of the storage box 40 can be maximized.

In addition, according to the exemplary embodiment of the present invention, the tray cover 45 can be used as the step or bench or the article can be seated on the opened tray cover 45 at the time of opening the storage box 40.

According to an exemplary embodiment of the present invention, a storage apparatus is installed by using an inner space in a rear bumper corresponding to a spare space of a vehicle, such that spatial utilization of the vehicle can be maximized and in particular, an article having a large length can be stored by extending a drawn out storage box horizontally and furthermore, when the storage box is opened, a tray cover is used as a step or a bench or the article can be seated on the opened tray cover, thereby significantly improving the merchantability of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A storage apparatus for a vehicle, comprising:
   a rear back beam slidably installed in the vehicle, wherein the rear back beam is configured to be drawn out from a rear bumper while sliding to a rear side of the vehicle; and
   a pair of left and right storage boxes installed to be slidably seated on the rear back beam and extending while sliding in a traverse direction of the vehicle along the rear back beam when the rear back beam is drawn out to the rear side of the vehicle;
   a back beam shifting device coupled to the rear back beam, a rear floor panel, and a rear side member to which the rear back beam is slidably engaged, and configured to slide the rear back beam in a longitudinal direction of the vehicle along the rear side member; and
   a storage box shifting device coupled with the back beam shifting device and the pair of storage boxes to slide the pair of storage boxes in the traverse direction of the vehicle.

2. The storage apparatus for the vehicle of claim 1, wherein the back beam shifting device includes:
   a pair of guide rails installed to cover a pair of fixation frames and be fixed to the bottom of the rear floor panel at lateral sides of the vehicle and installed with both ends placed in the longitudinal direction of the vehicle;
   a shift bar installed with both ends thereof connected to the pair of guide rails to slide in the longitudinal direction on the pair of guide rails;
   a pair of first link members of which each one end is hinge-coupled to the shift bar and each of the other ends is hinge-coupled to the pair of left and right storage boxes;
   the pair of fixation frames integrally coupled to a rear end of the rear side member in the longitudinal direction of the rear side member; and
   the pair of frame cases installed to be connected to both distal ends of the rear back beam to slidably move in the longitudinal direction on the fixation frames.

3. The storage apparatus for the vehicle of claim 2, wherein the storage box shifting device includes:
   a rear stopper integrally protruded on a rear side surface of the fixation frame to restrain rear movement of the frame cases; and
   a back beam plate fixed to be seated on the rear back beam and having plate grooves into which side surfaces of the pair of storage boxes selectively fit, respectively, wherein the plate grooves guide the pair of storage boxes to move backward while the shift bar moves backward and wherein the storage boxes are released from the back beam plate and move in the traverse direction of the vehicle by the first link members when the rear back beam is drawn out to the rear side of the vehicle.

4. The storage apparatus for the vehicle of claim 2, wherein a front stopper restraining front movement of the frame case integrally protrudes on a front end surface of the fixation frame.

5. The storage apparatus for the vehicle of claim 2, wherein the pair of first link members has a characterized structure in which an interval between the first link members is larger at the other ends hinge-coupled with the storage boxes than the one ends hinge-coupled with the shift bar.

6. The storage apparatus for the vehicle of claim 3, wherein each of the pair of left and right storage boxes includes:
   a lower channel fixed onto the rear back beam in the traverse direction of the vehicle;
   a lower plate installed on the lower channel to move in the longitudinal direction of the lower channel, hinge-coupled with the other ends of the first link members penetrating the rear back beam and the lower channel, and having a plate protrusion fit in a plate groove integrally formed on one side surface of the lower plate;
   a lower tray fixed onto the lower plate and having a space for keeping an article provided therein;
   an upper tray rotatably coupled with respect to the lower tray to open/close the lower tray; and
   a tray cover integrally coupled to the upper tray.

7. The storage apparatus for the vehicle of claim 6, further including a plurality of second link members of which both ends are hinge-coupled to both sides of the lower tray and the upper tray, respectively.

8. The storage apparatus for the vehicle of claim 6, wherein the plate groove includes:
   a primary groove that is formed toward a rear side from a front side of the back beam plate and receives the plate protrusion of the lower plate to enable the lower plate to move in the longitudinal direction and prevent the lower plate from being removed therefrom; and
   a secondary groove having a larger width than the plate protrusion and disposed at a rear end of the primary groove to enable the lower plate to be removed therefrom.

9. The storage apparatus for the vehicle of claim 6, wherein the tray cover that rotates to the rear side of the vehicle is usable as a step or a bench.

* * * * *